C. CASTRONUOVO.
DRYING APPARATUS.
APPLICATION FILED MAR. 19, 1913.

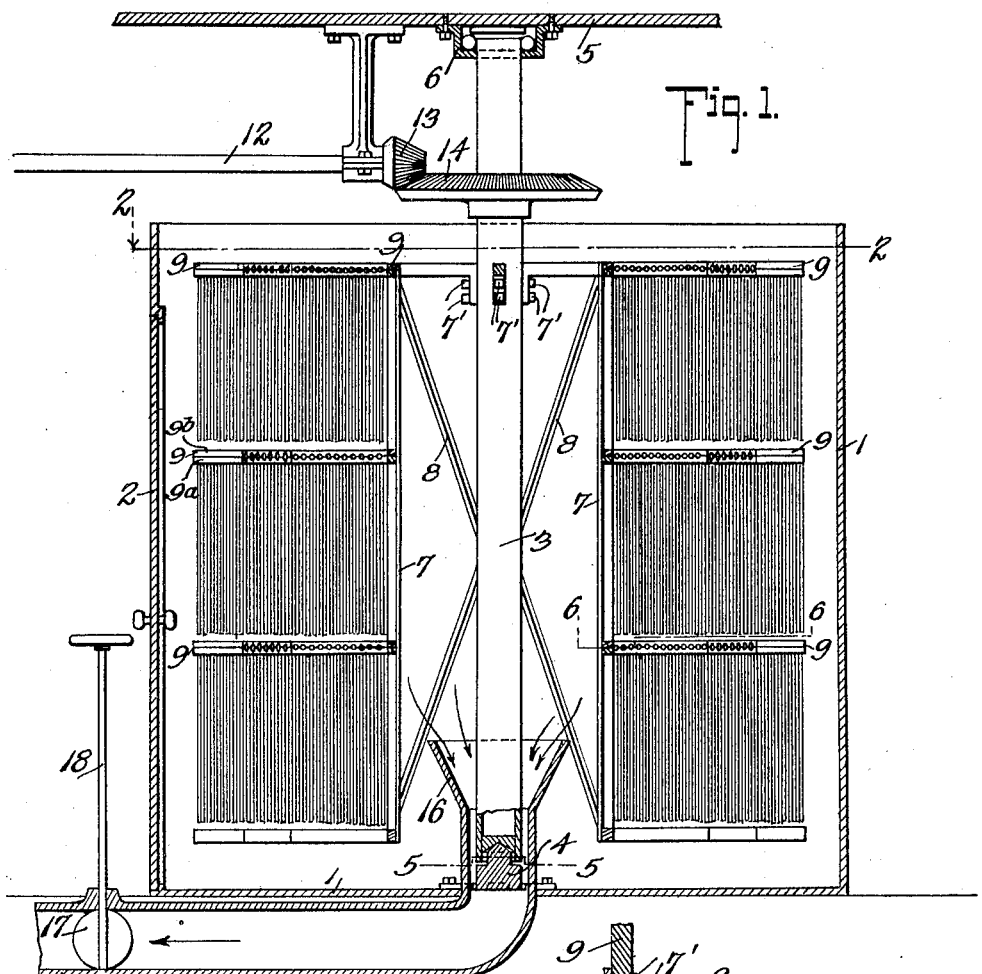
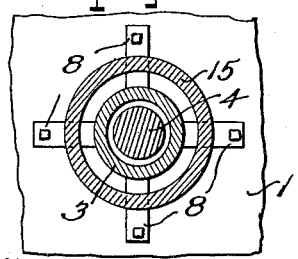

1,088,536.

Patented Feb. 24, 1914.
2 SHEETS—SHEET 2.

Witnesses
E. H. Wagner.
G. W. Kirkley

Inventor
Carmelo Castronuovo

By Robb & Robb
Attorneys

UNITED STATES PATENT OFFICE.

CARMELO CASTRONUOVO, OF NEW YORK, N. Y., ASSIGNOR OF ONE-THIRD TO EUGENE DEVOTO, OF PRICE, UTAH, AND ONE-THIRD TO LUIS DEVOTO, OF WEST HOBOKEN, NEW JERSEY.

DRYING APPARATUS.

1,088,536.    Specification of Letters Patent.    Patented Feb. 24, 1914.

Application filed March 19, 1913. Serial No. 755,317.

*To all whom it may concern:*

Be it known that I, CARMELO CASTRONUOVO, a subject of the King of Italy, residing at New York, in the county of New York and State of New York, have invented certain new and useful Improvements in Drying Apparatus, of which the following is a specification.

The present invention relates in general to drying apparatus and particularly to that type designed especially for drying macaroni. While the adaptability of my invention to the purpose just mentioned is its main advantage, it is to be understood that its use might be readily extended to the drying of any articles where a maximum number must be placed in a minimum amount of space.

One of the essential features of my invention is the provision of a novel form of supporting reel for the articles,—in this instance the macaroni tubes, whereby a plurality of the same may be suspended and submitted to the action of air, and another object has been to provide means for rotating this reel in combination with suction means whereby the moisture laden air may be withdrawn from the compartment in which the macaroni is located, thereby causing the macaroni to be very quickly and thoroughly dried.

Figure 2:
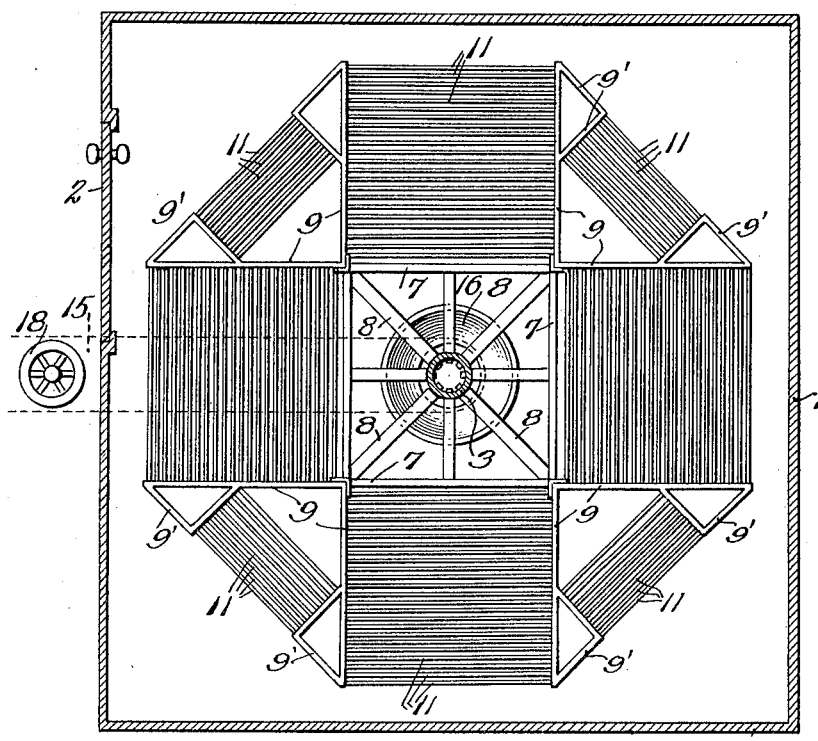
Figure 3:
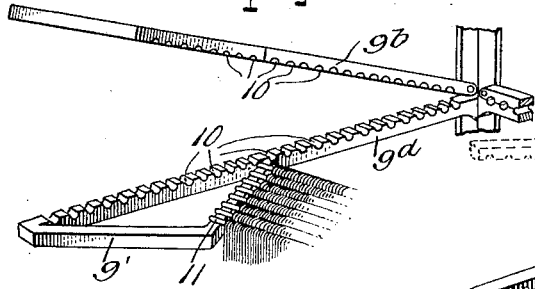
Figure 4:
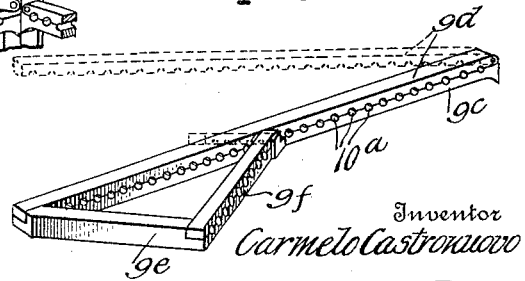

For a full understanding of the present invention, reference is to be had to the following description and the accompanying drawings, in which:

Figure 1 is a vertical sectional view through an apparatus constructed in accordance with my invention. Fig. 2 is a horizontal sectional view taken about on the line 2—2 of Fig. 1, and showing in plan the supporting reel for the macaroni. Fig. 3 is a fragmentary perspective view showing one of the suspension arms of the reel. Fig. 4 is a view of a slightly modified form of arm. Fig. 5 is a fragmentary sectional view taken about on the line 5—5 of Fig. 1. Fig. 6 is a horizontal sectional view taken about on the line 6—6 of Fig. 1.

Throughout the following detail description and on the several figures of the drawings, similar parts are referred to by like reference characters.

Specifically describing the apparatus comprising my invention it may be said that it is of any suitable size, dependent upon the desired capacity. It consists preferably of a main compartment 1, which for the purposes of this description will be called the drying chamber. This chamber is uncovered in the form illustrated in the drawings and provided with a door 2 to permit of ready access thereinto. Mounted centrally within the chamber 1 is a rotatable shaft 3 vertically disposed and having its lower bearing designated 4 in the center of the drying chamber. The shaft 3 extends through the chamber to the ceiling 5 of the surrounding room where its upper bearing 6 is located. Secured to the shaft 3 by means of bolts or other fastening members 7' is a supporting frame 7 of rectangular shape and also having diagonal brace rods 8 connecting the frame to the central portion of the shaft as shown in Fig. 1. Extending from the frame 7 in different horizontal planes are a plurality of supporting arms 9 which in the drawings are arranged in several tiers, there being four groups of such tiers at the respective corners of the frame 7. The arms 9 are arranged in pairs as shown in Fig. 2 extending from the corners of the frame 7 at right angles to each other and each one of the arms terminates in a triangularly shaped auxiliary frame 9'. Furthermore, each of the arms is composed of separable sections, the lower one designated $9^a$ being rigidly connected to the frame 1 at its inner end and the upper section $9^b$ being pivotally mounted at its inner end as is seen most clearly in Fig. 3, while both sections are provided with a plurality of notches extending throughout the arm with the exception of one side of the triangular terminal or auxiliary frame 9'.

In the use of the apparatus, the macaroni tubes in their doughy or undried state are strung over sticks 11, which sticks are then placed in the notches of the arms, between the sections of which they are clamped, said sticks being arranged in rows both between the corner groups of arms and also between the triangular end portions of each pair, and it will be obvious by reference to Fig. 2 that a very large quantity of macaroni may thus be accommodated on the reel which is made up of the frame 7 and arms 9. The reel is then rotated by any suitable mechanism, such for instance as the horizontal drive shaft 12 which is connected to any suitable source of power at one end and at the other end to the shaft 3 through the pinions 13 and 14.

As a part of and in combination with my apparatus, I preferably employ some means for withdrawing the humid air from the drying chamber 1 so that the drying process may be carried forward in the quickest manner possible and for this purpose any form of suction apparatus (not shown) may be used, a conduit 15 leading therefrom entering preferably the lower central portion of the chamber 1 and extending thereinto a suitable distance. This conduit 15 extends into the interior portion of the reel and terminates in a flared mouth 16 surrounding the lower portion of the shaft 3, the lower bearing of which shaft is preferably located in the terminal portion of the conduit 15. Thus the moisture laden air is simultaneously withdrawn from between the groups of arms on which the macaroni is strung as the reel is rotated.

At 17 is designated a valve having a manually operable stem 18 extending above the conduit 15 in a convenient manner for manipulation, and by means of this valve the suction may readily be regulated as desired and as the reel is rotated more or less rapidly.

The advantage of employing the particular construction of arm 9 having the separable sections arranged as shown in Fig. 3 will be obvious, but it may also be desirable to slightly modify this construction in the manner disclosed in Fig. 4 wherein the arm consists of the lower section $9^c$ rigidly secured to the frame of the reel and the upper section $9^d$ pivotally connected at its inner end so as to permit the disposition of the macaroni sticks in the notches $10^a$ of said arm. The outer end of the arm of this modified form terminates in the triangular auxiliary frame $9^e$, and only one side of this auxiliary frame, namely $9^f$ is provided with separable sections, the operation of these separable sections being shown in dotted lines in Fig. 4.

From the foregoing it will be apparent that rotation of the reel with the macaroni suspended from the supporting arms will create a circulation of air within the drying chamber and which circulation is greatly increased by the suction through the conduit 15, the air naturally being thrown against the sides of the chamber by reason of the rotation of the reel from which locality it is drawn to the central portion of the reel through the mouth 16 of the conduit 15.

What I claim as my invention and desire to secure by Letters Patent, is:

1. In a macaroni drying apparatus, the combination of a drying chamber, a rotatable shaft mounted in said chamber, a reel secured to said shaft, arms carried by said reel, macaroni supporting members mounted in said arms, and suction means for withdrawing air from the drying chamber, said means comprising a conduit projecting into the chamber between the arms secured to said reel.

2. In a macaroni drying apparatus, the combination of a drying chamber, a rotatable shaft mounted in said chamber, a reel secured to said shaft, arms carried by said reel, macaroni supporting members mounted in said arms, suction means for withdrawing air from the drying chamber, including a suction conduit projecting into the chamber and in which the lower end of the shaft aforesaid has its bearing.

3. In a macaroni drying apparatus, the combination of a drying chamber, a rotatable shaft mounted in said chamber, a reel secured to said shaft and comprising a frame, a plurality of arms secured to said frame in spaced relation to each other, macaroni supporting members mounted in said arms, and suction means including a suction conduit projecting into the drying chamber between the frame of said reel whereby air is caused to circulate from the walls of the chamber to the central portion of the reel.

4. In a macaroni drying apparatus, the combination of a drying chamber, a supporting member in said chamber, a plurality of arms secured to the supporting member, each arm terminating in a frame, and macaroni supporting members adapted to be suspended from between the arms and from between the frames.

5. In a macaroni drying apparatus, the combination of a drying chamber, a reel mounted in said chamber and comprising a plurality of arms, said arms being arranged in groups and each group comprising a pair of arms disposed at angles to each other, each of said arms terminating in a triangular frame, macaroni supporting members adapted to be suspended from between the groups of arms and from between the frames of said arms, and suction means for withdrawing air from said chamber.

In testimony whereof I affix my signature in presence of two witnesses.

CARMELO CASTRONUOVO.

Witnesses:
  LUIGI DEVOTO,
  LUIGI GINOCCHI.

---

Copies of this patent may be obtained for five cents each, by addressing the "Commissioner of Patents, Washington, D. C."